United States Patent [19]

Anderson, deceased et al.

[11] 4,096,549

[45] Jun. 20, 1978

[54] MULTILAMP PHOTOFLASH ASSEMBLY

[75] Inventors: Lester F. Anderson, deceased, late of San Diego, Calif., by Emma M. Anderson, administratix; John J. Vetere, Danvers, Mass.; William J. Harvey, Montoursville, Pa.

[73] Assignee: GTE Sylvania Incorporated, Stamford, Conn.

[21] Appl. No.: 740,278

[22] Filed: Nov. 9, 1976

[51] Int. Cl.² .............................................. G03B 15/02
[52] U.S. Cl. ........................................ 362/11; 362/13; 431/93
[58] Field of Search ........................... 240/1.3; 354/142; 431/93, 95 R, 95 A; 362/3, 11, 13

[56] References Cited

U.S. PATENT DOCUMENTS

| 3,584,556 | 6/1971 | Harvey | 240/1.3 X |
|---|---|---|---|
| 3,795,477 | 3/1974 | Broadt | 240/1.3 X |
| 3,810,214 | 5/1974 | Malone et al. | 354/148 |
| 4,059,387 | 11/1977 | Witterick et al. | 431/93 |

FOREIGN PATENT DOCUMENTS

| 2,444,128 | 3/1976 | Germany | 240/1.3 |
|---|---|---|---|
| 2,420,607 | 11/1975 | Germany | 240/1.3 |
| 2,438,992 | 3/1976 | Germany | 240/1.3 |
| 2,614,272 | 10/1976 | Germany. | |

Primary Examiner—Fred L. Braun
Attorney, Agent, or Firm—Lawrence R. Fraley

[57] ABSTRACT

A photoflash assembly which utilizes a plurality of percussive flashlamps in one region of the assembly's housing and a plurality of percussive flashlamps in a second region separate from the first. The lamps in the first region are fired when the striking mechanisms associated therewith are actuated by movable actuators, e.g., elongated preformed wires, which move in response to mechanical actuation from one of the housing's mounting structures. Lamps in the second region are subsequently fired when the striking mechanisms associated therewith are actuated by the movable actuators which move in response to mechanical actuation from another of the housing's mounting structures.

12 Claims, 3 Drawing Figures

MULTILAMP PHOTOFLASH ASSEMBLY

CROSS REFERENCE TO CO-PENDING APPLICATION

Another application, Ser. No. 740,279, entitled "Multilamp Assembly With Rotatable Actuator" (Inventors: J. W. Shaffer et al.), was filed Nov. 9, 1976, and describes a multilamp photoflash assembly which employs a rotatable actuator for actuating the striking mechanisms associated with respective flashlamps in two adjacent regions of the assembly's housing.

BACKGROUND OF THE INVENTION

The present invention relates to photoflash assemblies and particularly to photoflash assemblies of the multilamp variety. More particularly, the invention relates to multilamp photoflash assemblies which employ percussively-ignitable flashlamps.

Primarily, there are two types of multilamp photoflash assemblies available today for camera users. The first group are those requiring electrical actuation to fire (or "flash") the flashlamps in sequence with the camera's switching mechanism. Included in this variety are the earlier popular "flashcube", the more recently introduced linear arrays known as "flash bars", and the vertically-oriented planar arrays known as "flip-flash" devices. Examples of these assemblies are illustrated in U.S. Pat. Nos. 3,327,105 (Kottler et al), 3,598,984 (Slomski), and 3,937,946 (Weber), respectively. The source of electrical energy necessary to fire the associated flashlamps is usually provided within the camera, typically in the form of dry cell batteries or piezoelectric elements.

The second group of multilamp photoflash assemblies available today are those which depend on some form of mechanical actuation to fire the flashlamp. The flashlamps most usually used in these assemblies are of the percussively-ignitable variety with an example disclosed in U.S. Pat. No. 3,535,063 (Anderson et al.), said patent assigned to the assignee of the present invention. Percussive flashlamps comprise a hermetically-sealed, transparent glass envelope which includes therein a quantity of combustible material, e.g., zirconium foil and a combustion supporting atmosphere, e.g., oxygen. These flashlamps are usually associated with a striking mechanism such as the pre-energized striker spring described in U.S. Pat. No. 3,597,604 (Shaffer). U.S. Pat. No. 3,597,604 is also assigned to the assignee of the present invention.

While electrically-actuated flashlamp assemblies possess several advantages, such devices also contain inherent disadvantages. Ignition failures represent the most critical of these and usually result from weak batteries, dirty or corroded contacts, faulty switching mechanisms, etc. Failures of this type are not found in the mechanically-actuated percussive flashlamp devices as described above and as a result, said devices possess a substantially greater degree of reliability over electrically-actuated assemblies.

It is believed therefore, that a mechanically-actuated multilamp photoflash assembly which employs therein percussive-type flashlamps and which operates in a more facile manner than previously known mechanical assemblies would constitute an advancement in the art. It is further believed that such an assembly which is further capable of substantially preventing the photograhic phenomenon known as "red-eye" would also constitute an art advancement. "Red-eye" is the deleterious result of light being reflected by the retinas of subjects' eyes onto the photographic film to indicate the eye's pupils as being red. The presently known methods for preventing "red-eye" involve spacing the illuminating flashlamp a specified distance from the camera's lens. It will be understood from the following description that one of the key features of the instant invention is the substantial prevention of "red-eye".

OBJECTS AND SUMMARY OF THE INVENTION

It is therefore a primary object of the present invention to enhance the multilamp photoflash assembly art.

It is another object of the invention to provide photoflash assembly which utilizes the aforementioned highly reliable percussively-ignitable flashlamps.

An even further object of the invention is to provide an assembly of the nature described wherein the striking mechanisms associated with the percussive flashlamps are triggered by mechanical actuation.

Still another object is to provide an assembly of the nature described which operates in a facile manner, is relatively inexpensive to manufacture, and substantially prevents the photographic phenomenon known as "red-eye".

In accordance with one aspect of the invention, there is provided a multilamp photoflash assembly comprising a housing which defines two separate regions therein, the housing further including mounting structures thereon adjacent each of the separate regions. Within each region are a plurality of percussively-ignitable flashlamps and associated with each of these lamps is a pre-energized striking mechanism. The striking mechanism fire the respective flashlamps upon actuation thereof. The assembly further comprises an actuation means movably positioned within the housing and extending through both of the housing's defined regions. The actuation means actuates the striking mechanisms in the first region in response to a mechanical actuation input from the mounting structure adjacent the second region and actuates the striking mechanisms in the second region in response to a mechanical input from the structures adjacent the first region.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
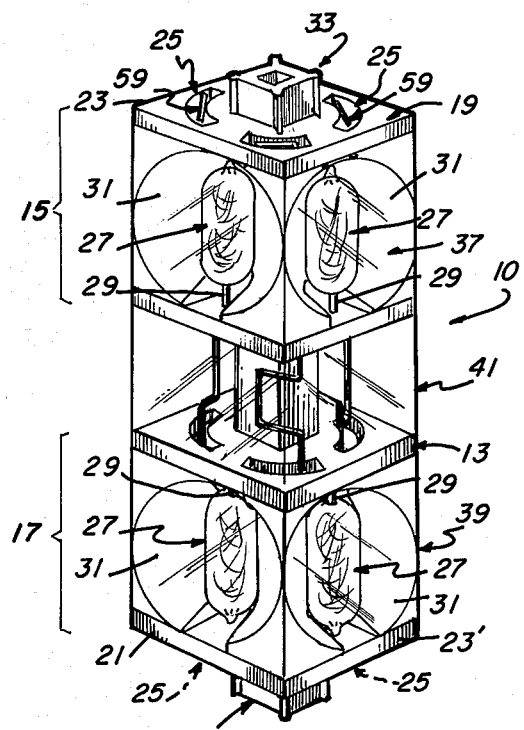
FIG. 1 is an isomeric view of a multilamp photoflash assembly in accordance with a preferred embodiment of the invention.

With particular reference to the drawings, there is shown in FIG. 1 a multilamp photoflash assembly 10 in accordance with a preferred embodiment of the invention. Assembly 10 comprises a housing 13 which defines therein the first and second separate regions 15 and 17, respectively. Located on housing 13 adjacent first region 15 is a first mounting structure 19 for providing suitable mounting of assembly 10 on an appropriate camera. Located on housing 13 adjacent second region 17 is a second mounting structure 21 substantially similar to first structure 19 but positioned on housing 13 in an opposing relationship thereto. Mounting structures 19 and 21 each preferably comprise a substantially planar base member (23 and 23' respectively). Included within each base are a plurality of apertures 25. Although apertures 25 are not shown within base 23' in FIG. 1, it is understood that these openings are included within the member. Furthermore, each base member preferably contains four apertures 25 therein.

Positioned within each of the regions 15 and 17 are a plurality of flashlamps 27. Lamps 27 are each preferably of the percussively-ignitable variety, one example being described in U.S. Pat. No. 3,535,063 (Anderson et al.). As defined therein, each lamp comprises a hermetically-sealed envelope which houses therein a quantity of combustible material and a combustion-supporting atmosphere.

Percussively-ignitable lamps, as defined within the aforementioned patent to Anderson et al., also comprise an extending primer which consists of an elongated hollow metal tube. Within the tube is positioned a wire anvil having located thereon a quantity of fulminating material. Deformation of the hollow metal tube causes the fulminating material to deflagrate up through the tube and ignite the combustible material. This sequence of events is otherwise referred to as "firing" or "flashing" the lamp and results in illumination of the respective area about the lamp. The aforedescribed extending primers are represented by numerals 29 in FIG. 1. With further regard to the embodiment of FIG. 1, it is preferred that the flashlamps 27 in region 17 be inverted with respect to flashlamps 27 in region 15. In other words, the primers 29 of each respective plurality of lamps are positioned in a facing relationship.

The preferred number of flashlamps within each of the regions 15 and 17 is four. Associated with each lamp 27 is a reflector 31 which functions to direct the lamp's illumination away from housing 13. The four lamps 27 in each of the regions 15 and 17 are shown as being arranged in an array to illuminate in different directions when fired.

With further regard to bases 19 and 21, each of these members includes thereon a depending mounting post (33 and 35, respectively). Posts 33 and 35 are substantially centrally located upon the planar bases and function to provide indexable mounting for assembly 10 atop a camera. More specifically, post 35 inserts within a corresponding opening in the camera to position assembly 10 when it is desired to flash the lamps in region 15. Similarly, post 33 mounts assembly 10 when the lamps in region 17 are to be flashed. It can be seen, therefore, that regions 15 and 17 provide a predetermined spacing for each other when assembly 10 is mounted on a camera. This spacing assures substantial prevention of the aforementioned undesirable "red-eye" effect.

It is preferred to cover flashlamps 27 and associated reflectors 31 with a protective transparent member. In FIG. 1, a first transparent cover 37 is shown covering the lamps and reflectors in region 15 while a second cover 39 assures protection about region 17. Should it be desirable to space regions 15 and 17 a specified distance apart, as indicated in FIG. 1 by space 41, either a transparent or opaque cover member could be used to envelop this area.

Figure 2:
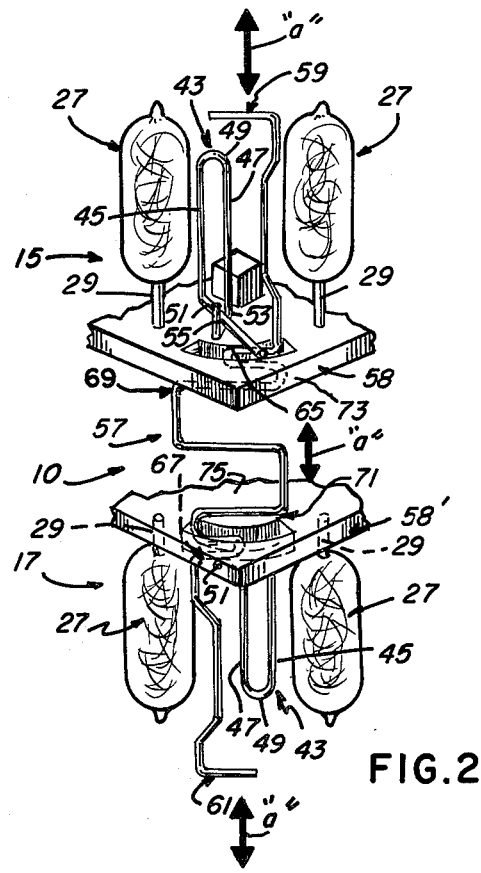
FIG. 2 is an isometric view similar to FIG. 1 with some of the assembly's components removed to simplify the description of FIG. 2.

For purpose of clarification, assembly 10 is shown in FIG. 2 as excluding several of the aforementioned components, e.g., reflectors 31, mounting structures 19, 21, etc. Two lamps 27 are shown as positioned within each of the separate regions 15 and 17 in the inverse relationship previously described. Firing of each lamp in regions 15 and 17 is accomplished by a pre-energized striking mechanism 43, each of which are positioned within regions 15 and 17 adjacent a respective one of the lamps and are thus associated therewith. Preferably, each striking mechanism comprises a folded torsional spring which includes two segments 45 and 47 joined by a bight 49. A striker portion 51 projects from segment 45 while a supporting foot portion 53 projects from segment 47. A catch 55 is located at the end of foot portion 53 to maintain striker arm portion 51 in a pre-stressed or cocked position. Spring 43 is substantially similar in configuration and operation to the spring mechanism described in U.S. Pat. No. 3,597,604 (Shaffer).

As stated, each spring 43 is adapted for firing one respective lamp 27. In the embodiment of FIG. 2, the spring 43 shown positioned upon a shelf 58 in region 15 is adapted for firing the lamp 27 located on the left. Accordingly, striker arm 51 passes over catch 55 to strike metal primer tube 29 of this lamp when spring 43 is actuated. Similarly, the corresponding striker arm of the spring shown invertibly positioned in region 17 passes over the respective catch 55 to strike the primer tube 29 of the lamp located on the right.

Figure 3:
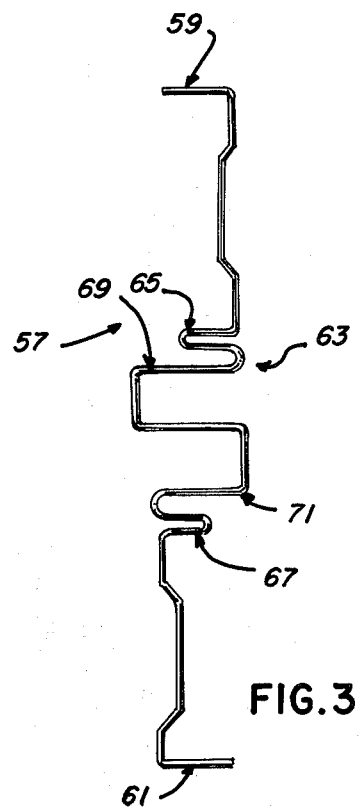
FIG. 3 is an elevational view of the preferred actuation means of the invention.

Mechanical actuation of springs 43 is accomplished in the present invention by a movable actuation means 57 shown in FIGS. 2 and 3. Means 57 preferably comprises an elongated preformed wire which extends through regions 15 and 17 to actuate the striking mechanisms 43 in region 15 in response to the mechanical actuation from mounting structure 21. Wire 57 also is capable of actuating the striking springs in region 17 in response to a mechanical actuation input from the first mounting structure 19. Mechanical actuation of preformed wire 57 is accomplished by engagement of the wire's opposing end portions 59, 61 with a corresponding triggering member located within the camera. Such a member and the corresponding method of operation is shown and described in U.S. Pat. No. 3,602,618 (Michatek). Basically, the trigger member will extend from the camera and engage each end portion 59 (also shown in FIG. 1) or 61 located within provided apertures 25 of the respective mounting structures to cause wire 57 to move in either of the directions represented in FIG. 2 by arrows "a". It can be seen that each wire 57 is associated with a singular lamp 27 and associated striking mechanism 43 in each of the regions 15 and 17. Accordingly, four wires 57 are preferably utilized in each assembly 10.

Wire 57 is better shown in FIG. 3 as comprising the aforedescribed ends 59 and 61 which are adapted for being positioned within apertures 25 of mounting structures 19 and 21, respectively. Wire 57 further comprises a centrally located engagement portion 63 which interconnects ends 59 and 61. Engagement portion 63 includes first and second triggering portions 65 and 67 which effect actuation of the respective striking mechanisms in regions 15 and 17, respectively. As shown in FIG. 2, trigger portion 65 engages the striker arm 51 associated with the spring in region 15 to lift arm 51 over catch 55 and thus cause it to strike the designated primer 29. This action occurs when the aforedescribed triggering member in the camera engages end 61 of wire 57.

Similar to the motion described above, triggering portion 67 engages the respective striker arm for the inverted spring in region 17 when upper end 59 is engaged by the camera's triggering member.

Still another feature of actuating wire 57 is shown in FIGS. 2 and 3. Engagement portion 63 further includes first and second stop portions 69 and 71, respectively, which define the extent of movement of wire 57 within regions 15 and 17. This movement is defined by the stops positively engaging one of the shelves upon which lamps 27 are located. More specifically, stop portion 69 engages a surface 73 of shelf 58 during upward movement of wire 57 to limit its movement in region 15 while stop 72 engages a surface 75 of a lower shelf 58' to limit the wire's movement into second region 17.

In the broader aspects of the invention, it is of course understood that assembly 10 need not comprise several of the components described in order to function in a satisfactory manner. For example, reflectors 31 and associated transparent covers 37, 39 can be excluded. These components are preferred in the present invention, however, to enhance the assembly's operating characteristics.

Thus there has been shown and described a multilamp photoflash assembly which provides for mechanical actuation of the striking mechanisms associated with each of the percussively-ignitable flashlamps positioned in the assembly. The assembly operates in a facile manner, is relatively easy and inexpensive to manufacture, and assures substantial prevention of "red-eye".

While there have been shown and described what are at present considered the preferred embodiments of the invention, it will be obvious to those skilled in the art that various changes and modifications may be made therein without departing from the scope of the invention as defined by the appended claims.

What is claimed is:

1. A multilamp photoflash assembly comprising:
   an elongated housing defining first and second separate regions therein, said housing including a first mounting structure thereon located adjacent said first region and a second mounting structure thereon located adjacent said second region;
   a plurality of percussively-ignitable flashlamps positioned within each of said first and second regions;
   a plurality of pre-energized striking mechanisms positioned within each of said first and second regions, each of said striking mechanisms associated with a respective one of said flashlamps for firing said flashlamp upon actuation thereof; and
   actuation means movably positioned within said housing and extending through said first and second regions for actuating said striking mechanisms in said first region in response to a mechanical actuation input from said second mounting structure and for actuating said striking mechanisms in said second region in response to a mechanical actuation input from said first mounting structure.

2. The photoflash assembly according to claim 1 further including a plurality of reflectors within each of said regions, each of said reflectors associated with a respective one of said flashlamps.

3. The photoflash assembly according to claim 1 wherein said flashlamps within each of said regions are arranged in an array to illuminate in different directions when fired.

4. The photoflash assembly according to claim 1 wherein the number of flashlamps within each of said regions is four.

5. The photoflash assembly according to claim 1 wherein each of said flashlamps includes a primer member extending therefrom, said primer members of said flashlamps in said first region and said primer members of said flashlamps in said second region positioned in a facing relationship.

6. The photoflash assembly according to claim 1 wherein each of said striking mechanisms comprises a folded torsional spring including two segments joined by a bight, a striker portion projecting from one of said segments, and a supporting foot portion projecting from the other of said segments and having a catch at the end thereof for engaging said striker portion to maintain said striker portion in a cocked position.

7. The photoflash assembly according to claim 2 further including a first transparent cover for covering said flashlamps and associated reflectors within said first region and a second transparent cover for covering said flashlamps and associated reflectors within said second region.

8. The photoflash assembly according to claim 1 wherein said actuation means comprises a plurality of elongated preformed wire members, each of said members associated with one of said striking mechanisms in said first region and one of said striking mechanisms in said second region.

9. The photoflash assembly according to claim 8 wherein each of said preformed wire members comprises first and second opposing end portions and a centrally located engagement portion interconnecting said opposing end portions.

10. The photoflash assembly according to claim 9 wherein each of said first and second mounting structures comprises a substantially planar base member including a plurality of apertures therein, said first end portions of said preformed wire members positioned substantially within said apertures of said first mounting structure, said second end portions of said preformed wire members positioned substantially within said apertures of said second mounting structure.

11. The photoflash assembly to claim 9 wherein each of said engagement portions of said preformed wire members comprises first and second spaced apart triggering portions, said first triggering portion adapted for engaging said associated striking mechanism in said first region to effect actuation thereof, said second triggering portion adapted for engaging said associated striking mechanism in said second region to effect actuation thereof.

12. The photoflash assembly according to claim 11 wherein each of said engagement portions of said preformed wire members further comprises first and second stop portions positioned adjacent said first and second triggering portions, respectively, for defining the extent of movement of said preformed wire member within said first and second regions, respectively.

* * * * *